United States Patent [19]

Paras

[11] 4,408,124

[45] Oct. 4, 1983

[54] BRH TEST PATTERN FOR GAMMA CAMERA PERFORMANCE (AN EVALUATOR)

[75] Inventor: Peter Paras, Derwood, Md.

[73] Assignee: The United States of America as represented by the Department of Health and Human Services, Washington, D.C.

[21] Appl. No.: 254,097

[22] Filed: Apr. 14, 1981

[51] Int. Cl.³ .................. G01D 18/00; G02B 5/00
[52] U.S. Cl. .................. 250/252.1; 250/505.1; 378/207
[58] Field of Search ............... 250/252.1, 363.5, 505.1, 250/515.1; 378/207

[56] References Cited

U.S. PATENT DOCUMENTS 4,055,771  10/1977  Goodenough et al. .......... 250/252.1
4,280,047   7/1981  Enos ................................. 378/207
4,286,168   8/1981  Carr .................................. 250/505.1

OTHER PUBLICATIONS

"Quality Control for Scintillation Cameras", HEW Publication (FDA) 76-8046, Jun. 1976, pp. 13-45.

Primary Examiner—Alfred E. Smith
Assistant Examiner—Janice A. Howell
Attorney, Agent, or Firm—Holman & Stern

[57] ABSTRACT

A test phantom for testing the performance of gamma cameras comprises a plate impervious to gamma rays having an orthogonal array of apertures defined therethrough. The apertures are uniform in size and are arranged in columns and rows. The columns are grouped such that the spacing between adjacent columns in each group differs from the spacing between adjacent columns in all of the groups, and such that the spacing between adjacent columns within each group is uniform throughout that group. The groups are arranged such that the more densely spaced groups are positioned proximate the middle of the array and the more widely spaced columns are disposed at the ends of the array. The resulting test pattern permits changes in the intrinsic resolution, uniformity and spatial distortion of a gamma camera to be observed simultaneously from a single transmission of the test pattern.

11 Claims, 5 Drawing Figures

BRH TEST PATTERN FOR GAMMA CAMERA PERFORMANCE (AN EVALUATOR)

TECHNICAL FIELD

The present invention relates to evaluation of the performance of nuclear medicine imaging systems and, more particularly, to a transmission test pattern which can be utilized to determine the performance parameters of gamma cameras. The test pattern or phantom of the present invention provides information on gamma camera performance parameters which cannot be measured with imaging procedures employed in the prior art for gamma camera performance evaluation.

BACKGROUND OF THE INVENTION

In nuclear medicine, quality control generally refers to those events by which the quality of a single component of the nuclear medicine procedure is governed. This is distinguished from quality assurance, which refers to a summation of all the functions by which imaging information is obtained from a procedure. Quality control is required within each are of the procedure to monitor the various parameters which can be defined and measured in order to guarantee the quality of the entire nuclear medicine process. Quality control in the operation of any nuclear medicine imaging system serves to ensure that the image represents the actual variation in radionuclide distribution within the patient and not variations in instrument performance. Therefore, those parameters important to the performance of imaging systems and associated instrumentation must first be evaluated and then measures routinely taken to ensure that these devices perform within the limits defined in the evaluation. Imaging instrument quality control is based on the principal that the image must represent an actual variation in the radiopharmaceutical distribution within the patient or the organ of interest and not an artifact introduced by the instrument or radioactive sources. The interpretation of static images and dynamic function studies is critically dependent upon the quality of the images. This dependence exists because significant changes in the condition of the patient may be reflected in subtle density changes in the image and could be confused with artifacts. Sub-optimal equipment performance or techniques may cause these changes to fall below the threshold of detectability and pass un-noticed by the physcian. For this reason, it is essential that nuclear medicine imaging equipment and procedures be maintained at an optimal level.

The three (3) major parameters which characterize gamma camera performance are spatial resolution, spatial distortion and field uniformity. Secondary parameters include temporal resolution, energy resolution and system sensitivity. Spatial resolution refers to the ability of an imaging system to produce two separate parallel line sources of radioactivity as separate entities. The smaller the distance between the two sources that can be resolved, the better is the spatial resolution of the system. Spatial resolution is also referred to as the system resolution or simply the resolution of an imaging instrument and is customarily represented by the Full Width At Half Maximum (FWHM) of the Line Spread Function (LSF). In general, there are two (2) methods for measuring resolution. The first is a direct method and determines the FWHM or more completely, the Modulation Transfer Function (MTF) from a plot of the line spread function (LSF). The plot is obtained utilizing a computer interfaced with the gamma camera system. This method, although quantitative and accurate, is not practical because it is complicated, time-consuming and specialized personnel are required to perform it. A second method for measuring resolution, with which the present invention is involved, is based on the principle that two adjacent parallel line sources which are spaced just one FWHM apart are imaged as a barely distinguishable double line. Therefore, the actual separation of the sources is equal to one FWHM if they can barely be distinguished. The prior art contains numerous transmission phantoms with a variety of line spacings for resolution measurements as a function of distance from the face of the camera collimator. These phantoms generally take the form of lead bars embedded in a plastic fixture. In one prior art phantom, the lead bars are grouped in sets of various widths and spacings. In another prior art phantom, a single array of lead bars is provided wherein the widths of all bars and spacings therebetween are equal and cover the full field of view of the scintallation camera. Still another prior art phantom includes four (4) sets of lead bars, each rotated 90° in orientation with respect to the adjacent set. The spacings between are equal to the bar widths within a given quadrant. Each quadrant has different bar widths.

Spatial distortion refers to the ability of an imaging instrument to accurately reproduce planar rays of linear radioactive sources in a manner which preserves all the spatial and geometric relationships of the array. Lead-bar phantoms are also employed in the prior art to determine deviation of the image from a straight line.

Uniformity refers to the ability of a scintigraphic instrument to reproduce with fidelity an image of a uniformly distributed radioactive source, and has been recognized as the most important parameter to be monitored to ensure optimum gamma camera performance. Nonuniformities appear to be dependent upon spatial distortions, variations in the energy window between photomultipliers and variations in efficiency and resolution as a function of position. Lead-bar phantoms have not proven to be valuable in measuring uniformity.

In addition to the lead-bar phantoms described above, the prior art also includes the phantoms consisting of lead plates with holes drilled or punched therethrough in a suitable array. In one such phantom, there are a series of 6 pie-sliced shaped sectors of holes, each of the sectors containing holes of different spacing and size. Another prior art hole-type phantom provides a uniform hole pattern and spacing designed to cover the entire field of view of the camera.

None of the above-described phantoms permits simultaneous observation of resolution, uniformity and spatial distortion from a single transmission of the test pattern.

SUMMARY OF THE INVENTION

It is therefore an object of the present invention to provide a test phantom for a gamma camera which transmits a pattern from which intrinsic resolution, uniformity, and spatial distortion can be observed simultaneously.

In accordance with the present invention, a test pattern or phantom consists of a lead plate with a plurality of holes defined therethrough in an orthogonal array. The spacing between the holes in one dimension is constant throughout the test pattern. In the other dimension, the holes are arranged in columns and the columns arranged in groups. The hole spacing within a group is constant but varies from group to group. In the preferred embodiment, the holes are 0.25 cm in diameter and the spacing varies from 0.015 cm to 0.7 cm in steps of 0.05 cm. The test pattern evaluator allows in accurate measurement of gamma camera resolution (within ±10%). This test pattern is also useful in observing nonuniformities and spatial distortions. Importantly, a single transmission image through the test pattern permits simultaneous observation of the intrinsic resolution, uniformity and spatial distortion of the gamma camera.

BRIEF DESCRIPTION OF THE DRAWINGS

The above and still further objects, features, and advantages of the present invention will become apparent upon consideration of the following detailed description of a specific embodiment thereof, especially when taken in conjunction with the accompanying drawings, wherein.

DESCRIPTION OF THE PREFERRED EMBODIMENT

Figure 1:
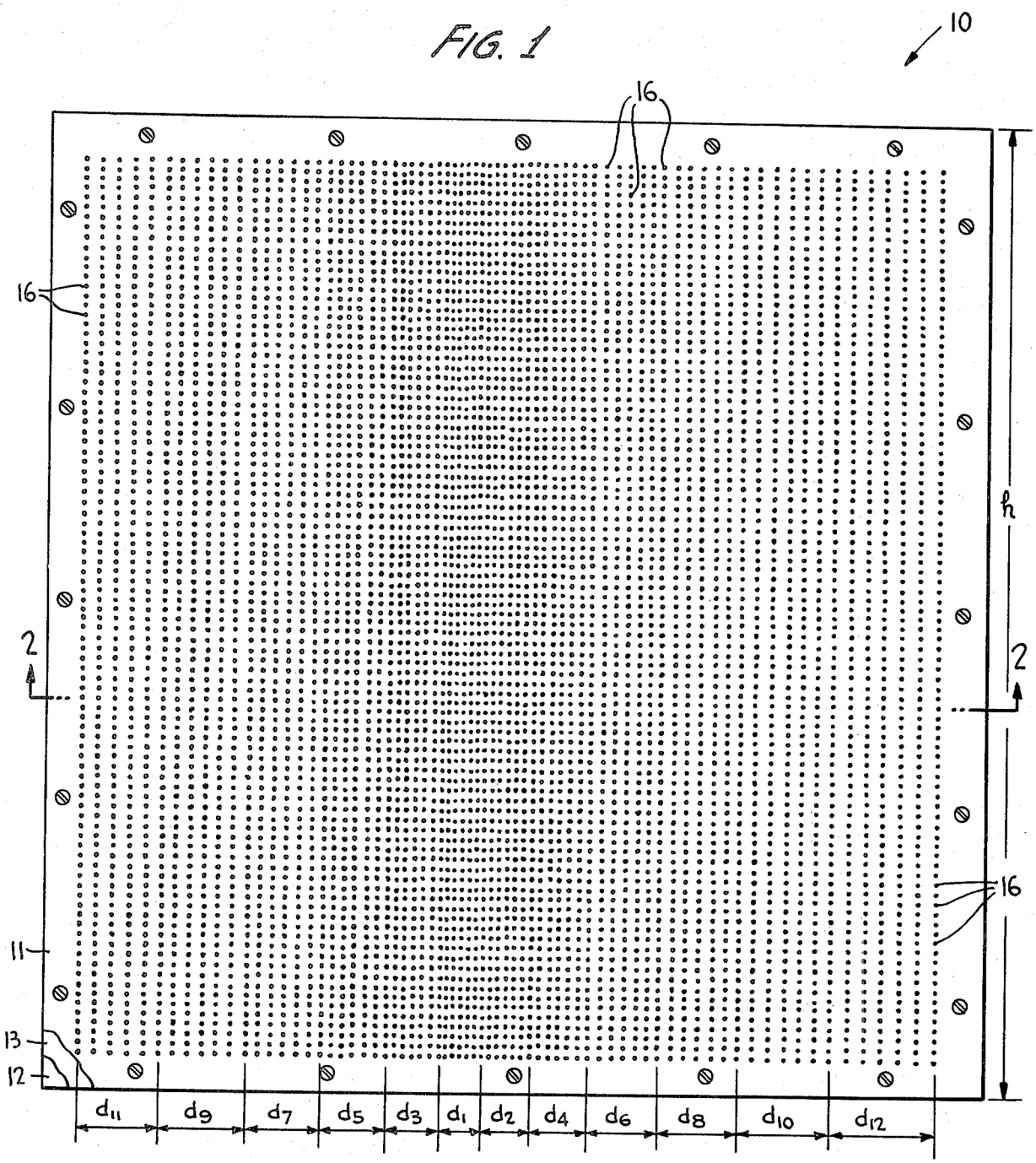
FIG. 1 is a front view in plan of a test phantom constructed in accordance with the present invention.
Figure 2:
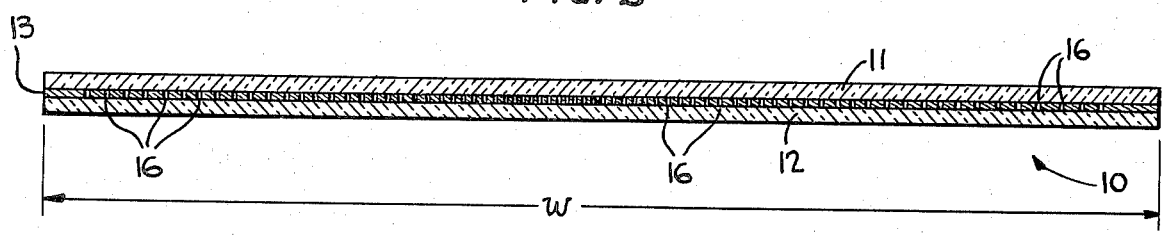
FIG. 2 is a view in section taken along lines 2—2 of FIG. 1.

Referring to the drawings in greater detail, the test phantom 10 according the present invention comprises a generally rectangular lead plate 13 sandwiched between two rectangular sheets of lucite 11 and 12. The sandwiched structure is held together by means of screws 14 extending perpendicularly through sheets 11 and 12 and plate 13. Screws 14 are preferably made of a plastic material which extend through top sheet 11 and engage suitably provided threaded holes (not shown) in bottom sheet 12. The particular material, lucite, specified for sheets 11 and 12 is exemplary only and any suitable material which is effectively transparent to the gamma camera may be employed. A plurality of holes 16 are defined through lead plate 13 and are arranged in an orthogonal array of columns and rows. For purposes of this description, a column is defined as a series of holes extending vertically in the drawings and a row is defined as a series of holes extending horizontally in the drawings. All of the holes are circular and have the same diameter. In each column, the spacing between holes 16 is the same. The spacing between the holes in each row is varied throughout the length of the row; this relative spacing between holes 16 in each row constitutes the essence of the present invention as described below.

Figure 3:
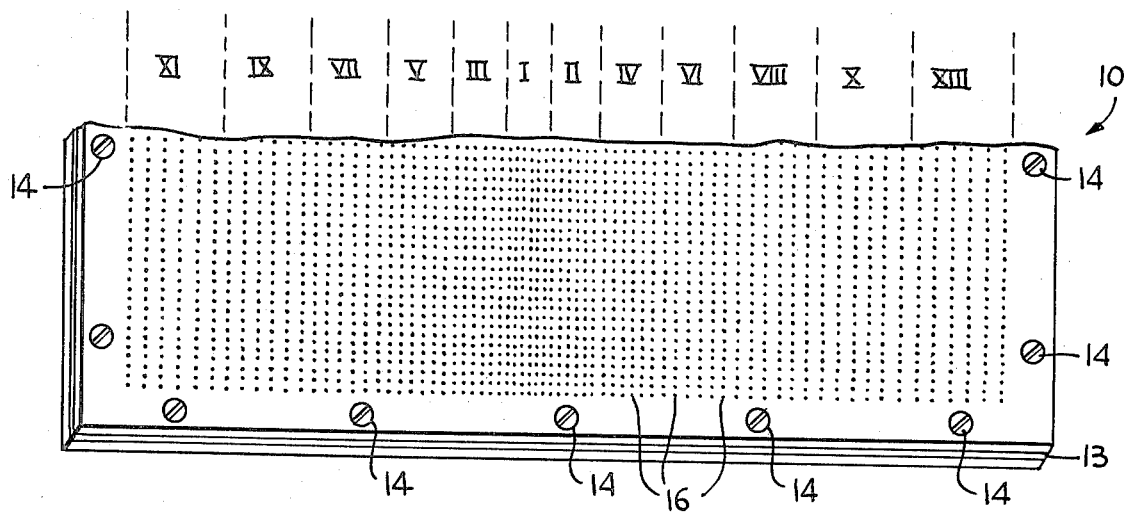
FIG. 3 is a partially diagrammatic view in perspective of a portion of the embodiment of FIG. 1.
Figure 4:
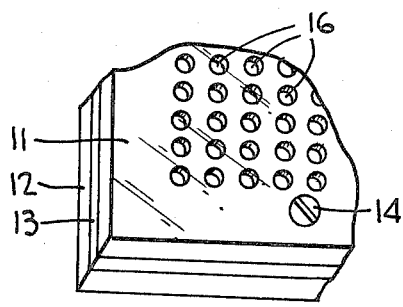
FIG. 4 is a detailed view in perspective of a portion of the embodiment illustrated in FIG. 4.
Figure 5:
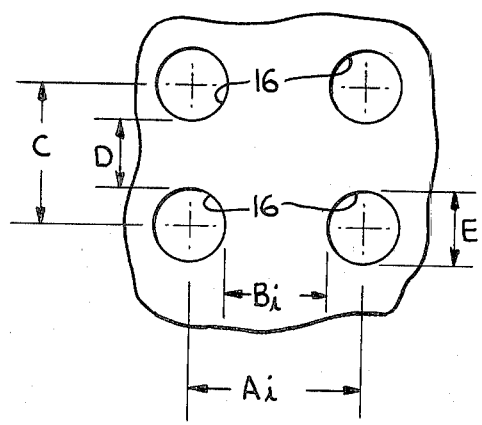
FIG. 5 is a diagrammatic representation of the dimensions of the various transmission holes defined through the test phantom of FIG. 1.

As best illustrated in FIG. 3, the columns of holes 16 are subdivided into twelve groups designated by roman numerals I-XII in FIG. 3. The grouping is defined in accordance with the horizontal spacing between the holes in the group. Each group includes six columns of holes 16. Within each group the horizontal spacing between successive holes 16 is constant. However, the horizontal hole spacing for each group is different from the horizontal hole spacing in every other group. The group designated by I, has the smallest horizontal hole space, the group designated by II has the next smallest horizontal hole spacing, etc., up the group designated by XII, which has the largest horizontal hole spacing. As can be seen from FIG. 3, the groups are not oriented in ascending or descending order across plate 13; instead, the groups are arranged, from left to right as viewed in FIG. 3, in the following sequence: XI, IX, VII, V, III, I, II, IV, VI, VIII, X, and XII. This sequence of columns provides an array wherein the two groups with the greatest horizontal hole spacing are disposed at opposite horizontal ends of the array, the two groups with the smallest horizontal hole spacing are disposed near the horizontal middle of the array, and the groups between the ends and the middle have successively decreasing hole spacings.

In the preferred embodiment, as illustrated, there are six columns in each group and, since there are twelve groups, there are 72 columns of holes. The preferred embodiment also includes 100 horizontal rows of holes 16 so that the total number of holes in the preferred embodiment is 7,200.

The following dimensions are provided by way of example only for a preferred embodiment of the invention. The height h and width w of the sheets 11 and 12 and plate 13 are both 52.4 cm. The thickness of lead plate 13 is 0.32 cm. The thickness of each of sheets 11 and 12 is 0.64 cm, making a total thickness of 1.6 cm for test phantom 10. The diameter E of all holes is 0.25 cm. The vertical spacing C between hole centers is 0.5 cm, leaving a minimal vertical lead spacing of 0.25 cm (dimension D) between the holes 16. The horizontal spacing between hole centers in each of the groups is as follows: in Group I, 0.4 cm; in Group II, 0.45 cm; in Group III, 0.5 cm; in Group IV, 0.55 cm; in Group V, 0.6 cm; in Group VI, 0.65 cm; in Group VII, 0.7 cm; in Group VIII, 0.75 cm; in Group IX, 0.8 cm; in Group X, 0.85 cm; in Group XI, 0.9 cm; and in Group XII, 0.95 cm. The spacing between adjacent columns in adjacent groups is arbitrarily chosen to be the spacing between holes in the group on the right as viewed in FIG. 1. Thus, the spacing between hole centers from the sixth to the seventh column from the right hand end, as view in FIG. 1 of the array, is 0.95 cm which corresponds to the spacing between the holes in the Group XII. Likewise, the on-center spacing between the left-most column of Group X and the right-most column of Group VIII, is 0.85 cm, corresponding to the horizontal hole spacing in Group X, etc. This spacing between adjacent columns of adjacent groups is reflected by the dimensions $d_1$ through small $d_{12}$ in FIG. 1. These dimensions correspond to the on-center spacing between the holes in the right-most column of the numbered group and the holes in the right-most column in the adjacent group. Thus, the dimension $d_{12}$ represents the on-center spacing between the holes in the right-most column of the array and the holes in the right-most column of Group X. Since there are six full spaces between these two columns, $d_{12} = 6 \times 0.95$, or 5.7 cm. The corresponding numbers for dimensions $d_1$ through $d_{11}$ are as follows: $d_1 = 2.4$ cm; $d_2 = 2.7$ cm; $d_3 = 3.0$ cm; $d_4 = 3.3$ cm; $d_5 = 3.6$ cm; $d_6 = 3.9$ cm; $d_7 = 4.2$ cm; $d_8 = 4.5$ cm; $d_9 = 4.8$ cm; $d_{10} = 5.1$ cm; and $d_{11} = 4.75$ cm. It is noted that $d_{11}$ encompasses only five full spaces between columns since it extends only from the first row of Group XI to the last row of that group rather than to the first row of another group; that is, Group XI is the last group on the array moving from right to left.

The BRH test pattern has been tested by taking the images of the test pattern with thirty gamma cameras using three radionuclide sources which emit photons of various energies: technetium-99 m (140 keV), xenon-133 (81 keV), and thallium-201 (69–80 keV). Each of the sources, either in a syringe or a small vial, was placed at least 2 meters away from the test pattern, aligned at its center. The test pattern was placed either in contact with the crystal of the gamma camera after the removal of the collimator or at a distance of 7 cm from the crystal aligned at its center. Images were obtained for these two positions of the test pattern and with a 7 cm thickness of Masonite or air used as a scattering medium between the crystal and the test pattern. The test showed that for technetium-99 m, the intrinsic resolution measured for the majority of gamma cameras was in good agreement with the manufacturers' specifications. On an individual basis, some cameras appear to give slightly superior results while others appeared to provide considerably inferior results. For xenon-133 and thallium-201, no data were previously available. As expected, the intrinsic resolution of all gamma cameras tested was found to be inferior for the lower energy radiations compared to the 140-keV gamma rays of technetium-99 m. In no case does there appear to be an appreciable effect from the scattering medium. The main effect of the Masonite was to increase the observed background between holes but not the appearance of the holes.

The test pattern of the present invention was also found useful in observing non-uniformities and spatial distortions. Minor non-uniformities displayed on flood images can be more easily recognized on the test pattern image of the present invention, perhaps because the eye recognizes variations in film density more readily with a pattern superimposed than without it. Since the holes are arranged in an orthogonal pattern, any deviation of the columns and rows from straight lines can be easily recognized. A comparison of such deviations with data from a computer analysis of non-linearities revealed deviations of less than 1% of the field-of-view diameter and can be easily recognized by viewing the test pattern image. The test pattern is clearly well suited for use in gamma camera quality control because changes in intrinsic resolution, uniformity and spatial distortion can be observed simultaneously from a single transmission image of the test pattern. The image from that transmission displays all sizes of the various spacing at the same time as compared to prior art phantoms which are limited to one size per phantom.

While, I have described and illustrated various specific embodiments of my invention, it will be clear that variations of the details of the constructions which are specifically illustrated and described may be resorted to without departing from the true spirit and scope of the invention as defined in the appended claims (i.e. small variation of the dimensions D, E, and $B_i$).

I claim:

1. A test phantom for testing performance of gamma cameras, said test phantom comprising a plate made of a material impervious to gamma rays and having an array of apertures defined therethrough, said array being arranged in parallel columns of apertures extending in a first direction and parallel rows of apertures extending in a second direction, said columns being arranged in plural groups wherein the spacing between adjacent columns in each group is different from the spacing between adjacent columns in all other groups but wherein the adjacent column spacing within each group is uniform throughout that group.

2. A test phantom according to claim 1, wherein the spacing between adjacent rows is uniform throughout said array.

3. The test phantom according to claims 1 or 2, wherein said array is an orthogonal array in which all rows have the same number of apertures and all columns have the same number of apertures.

4. The test phantom according to claims 1 or 2, wherein said apertures are all the same size and shape.

5. The test phantom according to claims 1 or 2, wherein the group of columns having the smallest spacing between adjacent columns is disposed proximate the middle of said rows, the two groups having the largest and next largest spacing between adjacent columns are disposed at respective ends of said rows, and remaining groups are positioned such that adjacent column spacing becomes progressively smaller from the ends of the rows toward the center of the rows.

6. The test phantom according to claim 5, further comprising first and second sheets of lucite, said plate being sandwiched between said sheets.

7. The test phantom according to claim 6, wherein said apertures are all circular and approximately 0.25 cm in diameter, wherein said groups of columns are twelve in number, wherein each of said groups includes six columns, wherein the adjacent column spacing ranges from 0.015 cm in the group with the smallest column spacing to 0.7 cm in the group with the largest column spacing, there being increments of 0.05 cm between adjacent column spacings in the other groups.

8. The test phantom according to claim 7, wherein said plate is made of lead.

9. The test phantom according to claims 1 or 2, wherein said apertures are all circular and approximately 0.25 cm in diameter, wherein said groups are twelve in number, wherein each of said groups includes six columns, wherein the adjacent column spacing ranges from 0.015 cm in the group with the smallest column spacing to 0.7 cm in the group with the largest column spacing, there being increments of 0.05 cm between adjacent column spacings in the other groups.

10. The test phantom according to claims 1 or 2, wherein said plate is made of lead.

11. A test phantom for testing performance of gamma cameras, said test phantom comprising:
a lead plate;
an array of apertures defined through said lead plate, said array being arranged in parallel aperture columns extending in a first direction and parallel aperture rows extending in a second direction, said columns being arranged in plural groups wherein the spacing between adjacent columns in each group is different from the spacing between adjacent columns in other groups but wherein the adjacent column spacing within each group is uniform throughout that group, and wherein the spacing between adjacent rows is uniform throughout the array; and
wherein said apertures are all the same general size and shape.

* * * * *